(12) United States Patent
Knipe et al.

(10) Patent No.: US 12,121,878 B2
(45) Date of Patent: Oct. 22, 2024

(54) POLYMER FORMULATIONS FOR EXTRUSION OF COMPOSITE $CO_2$ SORBENTS

(71) Applicant: Lawrence Livermore National Security, LLC, Livermore, CA (US)

(72) Inventors: Jennifer Marie Knipe, Oakland, CA (US); Sarah E. Baker, Dublin, CA (US); Maira Ceron Hernandez, Brentwood, CA (US); Jeremy M. Lenhardt, Tracy, CA (US); Simon Hoching Pang, Fremont, CA (US); Joshuah K. Stolaroff, Oakland, CA (US); Matthew A. Worthington, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 377 days.

(21) Appl. No.: 17/504,336

(22) Filed: Oct. 18, 2021

(65) Prior Publication Data

US 2022/0118424 A1    Apr. 21, 2022

Related U.S. Application Data

(60) Provisional application No. 63/094,717, filed on Oct. 21, 2020.

(51) Int. Cl.
*B29C 64/10* (2017.01)
*B01J 20/26* (2006.01)
(Continued)

(52) U.S. Cl.
CPC ....... *B01J 20/267* (2013.01); *B01J 20/28042* (2013.01); *B29C 64/118* (2017.08);
(Continued)

(58) Field of Classification Search
CPC ......... C08L 83/04; B29C 10/00; B29C 64/10; C09D 7/61; C09D 183/04
See application file for complete search history.

(56) References Cited

U.S. PATENT DOCUMENTS

| 6,559,199 B1 | 5/2003 | Pusineri et al. |
| 6,942,830 B2 | 9/2005 | Mulhaupt et al. |
| (Continued) | | |

FOREIGN PATENT DOCUMENTS

| EP | 1433749 A1 | 6/2004 |
| WO | 2017081028 A1 | 5/2017 |
| WO | 2017144461 A1 | 8/2017 |

OTHER PUBLICATIONS

Durban et al., U.S. Appl. No. 15/721,528, filed Sep. 29, 2017.
(Continued)

*Primary Examiner* — Caixia Lu
(74) *Attorney, Agent, or Firm* — Zilka-Kotab, P.C.

(57) ABSTRACT

An ink includes a vinyl-terminated polydimethylsiloxane polymer, a polydimethylsiloxane copolymer having a hydride component, wherein a hydride to a vinyl ratio (hydride:vinyl) is in a range of greater than 1:1 to about 4:1, a hydrophobic filler, a crosslinking agent, and a carbon dioxide-binding component. A method includes extruding an ink for forming a three-dimensional (3D) structure, the ink including a vinyl-terminated polydimethylsiloxane polymer, a polydimethylsiloxane copolymer having a hydride component, wherein a hydride to a vinyl ratio (hydride:vinyl) is in a range of greater than 1:1 to about 4:1, a hydrophobic filler, a crosslinking agent, and a carbon dioxide-binding component. The method further includes curing the 3D structure for forming a silicone polymer product having the carbon dioxide-binding component.

22 Claims, 11 Drawing Sheets

(51) Int. Cl.
*B01J 20/28* (2006.01)
*B29C 64/118* (2017.01)
*B33Y 10/00* (2015.01)
*B33Y 70/00* (2020.01)
*C08L 83/04* (2006.01)
*C09D 7/40* (2018.01)
*C09D 7/61* (2018.01)
*C09D 183/04* (2006.01)
*B29K 83/00* (2006.01)
*B29K 509/02* (2006.01)

(52) U.S. Cl.
CPC .............. *B33Y 10/00* (2014.12); *B33Y 70/00* (2014.12); *C08L 83/04* (2013.01); *C09D 7/61* (2018.01); *C09D 7/69* (2018.01); *C09D 183/04* (2013.01); *B01J 2220/46* (2013.01); *B29K 2083/00* (2013.01); *B29K 2509/02* (2013.01); *B29K 2995/0093* (2013.01); *C08L 2205/02* (2013.01)

(56) References Cited

U.S. PATENT DOCUMENTS

| | | | |
|---|---|---|---|
| 8,333,946 | B2 | 12/2012 | Gottschalk-Gaudig et al. |
| 10,689,491 | B2 | 6/2020 | Durban et al. |
| 2007/0287771 | A1 | 12/2007 | Yamazaki et al. |
| 2008/0033071 | A1 | 2/2008 | Irmer et al. |
| 2008/0291634 | A1* | 11/2008 | Weiser .................... H01L 23/42 361/708 |
| 2009/0018260 | A1 | 1/2009 | Correia et al. |
| 2009/0062417 | A1 | 3/2009 | Wrobel et al. |
| 2010/0239871 | A1 | 9/2010 | Scheffer et al. |
| 2013/0200554 | A1 | 8/2013 | Mueller |
| 2013/0245181 | A1 | 9/2013 | Friedel et al. |
| 2014/0356590 | A1 | 12/2014 | Hoffee et al. |
| 2015/0352782 | A1 | 12/2015 | Lisitsin et al. |
| 2016/0128909 | A1 | 5/2016 | Fontein et al. |
| 2016/0198576 | A1 | 7/2016 | Lewis et al. |
| 2016/0230005 | A1 | 8/2016 | Mayumi et al. |
| 2016/0244625 | A1 | 8/2016 | Clapp et al. |
| 2017/0039898 | A1 | 2/2017 | Kim |
| 2017/0144368 | A1 | 5/2017 | Bihari et al. |
| 2017/0225491 | A1 | 8/2017 | Miller |
| 2018/0066115 | A1 | 3/2018 | Achenbach et al. |
| 2018/0186076 | A1 | 7/2018 | Backer et al. |
| 2018/0244854 | A1 | 8/2018 | Drazba et al. |
| 2018/0272268 | A1 | 9/2018 | Nguyen et al. |
| 2018/0281276 | A1 | 10/2018 | Milroy et al. |
| 2018/0281294 | A1 | 10/2018 | Gottschalk-Gaudig et al. |
| 2019/0100626 | A1 | 4/2019 | Durban et al. |
| 2019/0232247 | A1 | 8/2019 | Nguyen et al. |
| 2019/0240611 | A1 | 8/2019 | Nguyen et al. |
| 2019/0292367 | A1* | 9/2019 | Dutta ..................... C08L 83/04 |

OTHER PUBLICATIONS

SIMTEC, "Reinforcing Fillers in Liquid Silicone Rubber Compounds," Simtec Silicone Parts, Dec. 11, 2017, 11 pages, retrieved from https://www.simtec-silicone.com/reinforcing-fillers-liquid-silicone-rubber-compounds/.

International Search Report and Written Opinion from PCT Application No. PCT/US18/53452, dated Oct. 26, 2018.

Duoss et al., "Three-Dimensional Printing of Elastomeric, Cellular Architectures with Negative Stiffness," Advanced Functional Materials, vol. 24, 2014, pp. 4905-4913.

Aerosil, "Technical Data Sheet for Aerosil R 9200," Product information, Jan. 2018, 1 page.

Schmalzer et al., "Gamma radiation effects on siloxane-based additive manufacture structures," Radiation Physics and Chemistry, vol. 130, 2017, pp. 103-111.

Grassie et al., "The Thermal Degradation of Polysiloxanes—Part 4: Poly (Dimethyl/Diphenyl Siloxane)," Polymer Degradation and Stability, vol. 2, 1980, pp. 67-83.

Qu et al., "Effect of Diphenylsiloxane Unit Content on Relaxation Behavior of Poly (dimethylsiloxane-co-diphenylsilxane)," Journal of Polymer Science: Part B: Polymer Physics, vol. 46, 2008, pp. 1652-1659.

Dowcorning, Sylgard (R) 184 Silicone Elastomer Kit (Base information is below), Dow Corning Corporation, Material Safety Data Sheet, Version 2.0, Revised Mar. 29, 2007, 15 pages.

Dowcorning, Sylgard (R) 184 Silicone Elastomer Kit (Curing Agent information is below), Dow Corning Corporation, Material Safety Data Sheet, Version 2.5, Revised Jan. 16, 2014, pp. 1-8.

International Preliminary Examination Report from PCT Application No. PCT/US2018/053452, dated Apr. 9, 2020.

Kopylov et al., "Silica fillers for silicone rubber," International Polymer Science and Technology, No. 5, 2010, pp. 32-43.

* cited by examiner

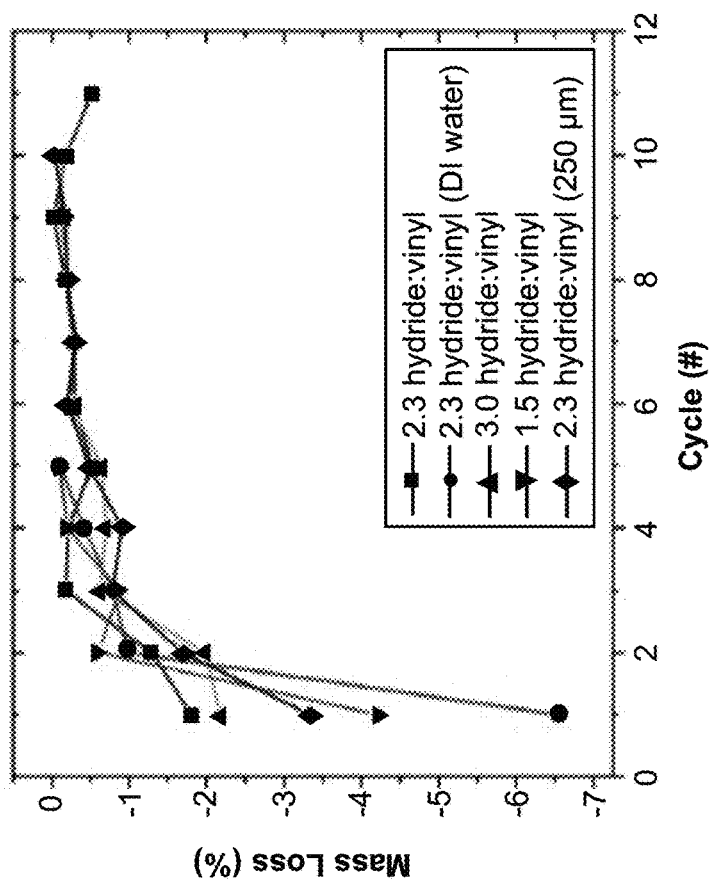
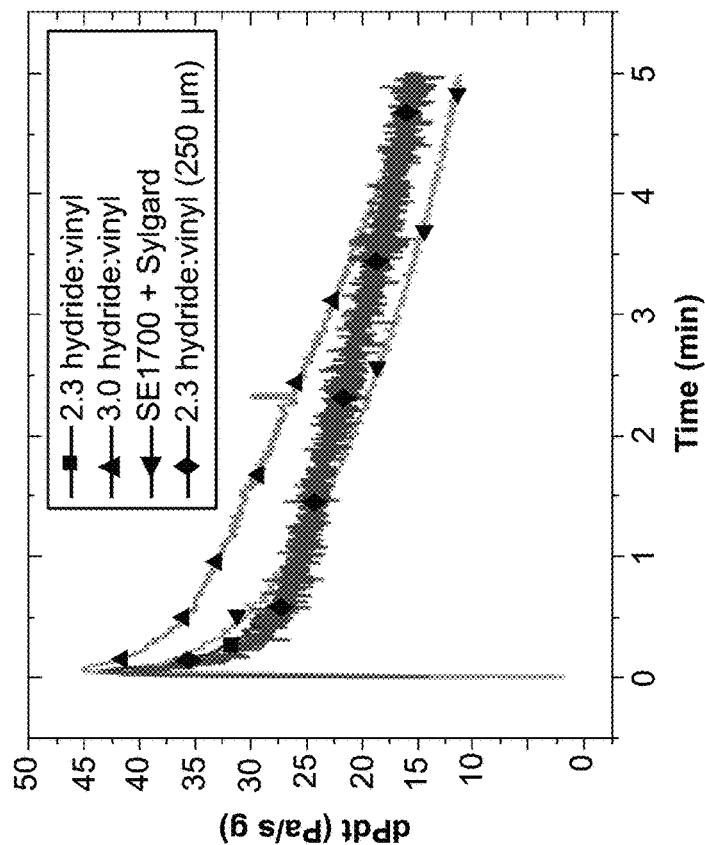
FIG. 7A
FIG. 7B

POLYMER FORMULATIONS FOR EXTRUSION OF COMPOSITE CO$_2$ SORBENTS

RELATED APPLICATIONS

This application claims priority to U.S. Provisional Patent Application No. 63/094,717 filed Oct. 21, 2020, which is herein incorporated by reference.

This invention was made with Government support under Contract No. DE-AC52-07NA27344 awarded by the United States Department of Energy. The Government has certain rights in the invention.

FIELD OF THE INVENTION

The present invention relates to carbon dioxide sorbents, and more particularly, this invention relates to additive manufacturing of silicone based composite carbon dioxide sorbents.

BACKGROUND

The exchange of gas into or out of a liquid continues to be a challenging problem in the absorption of gases into a solvent for industrial chemical processes, gas purification, and water purification. The potentially largest scale application is for the absorption of carbon dioxide ($CO_2$) for carbon capture and storage from power plants. Other applications include purification of natural gas, purification of biogas, and various industrial gas-to-liquid reactions. The most common method for gas absorption is the use of a "packed tower" absorption column. The absorption column is typically a cylindrical reactor filled with a packing material. Liquid solvent is pumped to the top of the tower and allowed to flow down over the packing while gas is blown from the bottom of the tower in the opposite direction. The liquid solvent forms a film over the wetted parts of the packing material, resulting in a gas-liquid interface where the exchange between $CO_2$ and solvent takes place.

A major limitation of these tower packings is that the surface-area to volume ratio of the liquid is limited by the thickness of the liquid film. This thickness is determined by the properties of the solvent but is typically around 1 mm. Additional area can be created in the tower using finer packings, but this leads to higher holdup of liquid, and impeded gas flow.

Solid sorbents are an alternative to liquid solvents in many applications, including large-scale $CO_2$ capture. Solid sorbents are preferred for air purification for, e.g., small submarines and personal underwater rebreathers and removal of volatile organic compounds emitted from certain industrial processes. Solid sorbents include mineral $CO_2$ sorbents like soda-lime, designer gas sorbents like metal-organic frameworks (MOFs), zeolites, and activated carbons. Solid sorbents are typically prepared in a powder and must be pelletized or formed into monoliths with a binder, reducing accessible surface area and yielding sub-optimal gas flow.

Additive manufacturing technology is a promising new venture for forming $CO_2$ sorbent structures in which there have been noted time savings for production, cost savings on materials and time, and possible metamaterials applications. In particular, direct ink writing (DIW) is a micro-extrusion technique where a printable ink is deposited in a layer-by-layer fashion to build up an object.

Recent contemplated approaches have demonstrated the flowable nature of liquid silicone materials that may be used in a DIW process of additive manufacturing (AM) where the resulting formed three-dimensional (3D) structures retain their shape using methodology such as that disclosed in U.S. patent application Ser. No. 15/721,528 which is herein incorporated by reference.

Creating a formulation of a polymer ink that includes a composite sorbent has been challenging. The ink preferably has an appropriate viscosity suitable for extrusion, i.e., it must typically be viscous enough to retain its general shape and allow layer-by-layer deposition of uncured material. However, in recent approaches, inks having composite sorbent do not have the appropriate viscosity to support more than 5 layers of deposition at a time. Moreover, the water uptake and carbonate leaching cannot be optimized.

Thus, it would be desirable to develop a manufacturing process that enables production of self-supporting structures having specific, reproducible geometries with small filament sizes (100 s of microns to millimeters) that are amenable to scaling for a commercial-scale facility.

SUMMARY

In one embodiment, an ink includes a vinyl-terminated polydimethylsiloxane polymer, a polydimethylsiloxane copolymer having a hydride component, wherein a hydride to a vinyl ratio (hydride:vinyl) is in a range of greater than 1:1 to about 4:1, a hydrophobic filler, a crosslinking agent, and a carbon dioxide-binding component.

In another embodiment, a method includes extruding an ink for forming a three-dimensional (3D) structure, the ink including a vinyl-terminated polydimethylsiloxane polymer, a polydimethylsiloxane copolymer having a hydride component, wherein a hydride to a vinyl ratio (hydride:vinyl) is in a range of greater than 1:1 to about 4:1, a hydrophobic filler, a crosslinking agent, and a carbon dioxide-binding component. The method further includes curing the 3D structure for forming a silicone polymer product having the carbon dioxide-binding component.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 7A is a plot of mass loss of samples having structures formed with 400 μm nozzle, except when noted, using ink formulations comparing hydrate/vinyl ratio and different hydration processes, according to various approaches.

FIG. 7B is a plot of $CO_2$ gas pressure of structures formed as described in FIG. 7A, according to various approaches.

DETAILED DESCRIPTION

Figure 1:
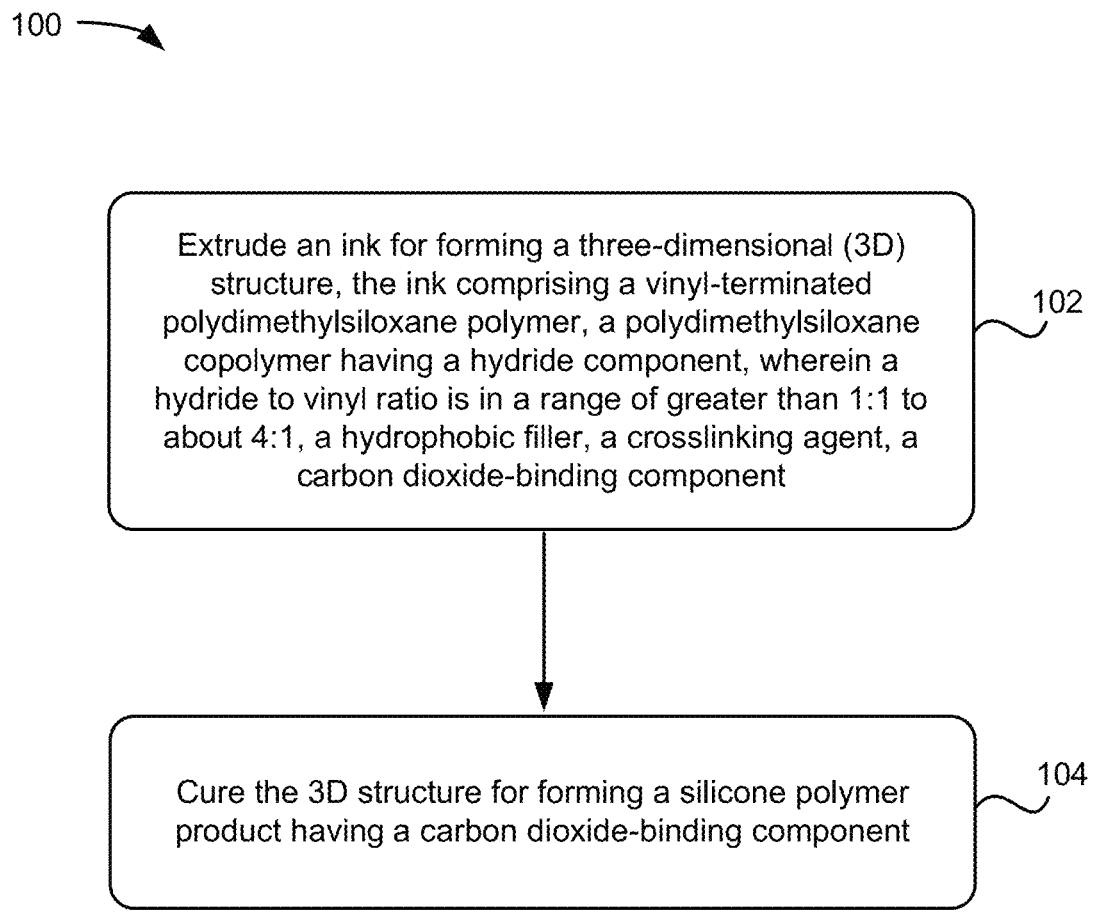
FIG. 1 is a flow chart of a method, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is noted that ambient room temperature may be defined as a temperature in a range of about 20° C. to about 25° C.

It is also noted that, as used in the specification and the appended claims, wt. % is defined as the percentage of weight of a particular component is to the total weight/mass of the mixture. Vol. % is defined as the percentage of volume of a particular compound to the total volume of the mixture or compound. Mol. % is defined as the percentage of moles of a particular component to the total moles of the mixture or compound. Atomic % (at. %) is defined as a percentage of one type of atom relative to the total number of atoms of a compound.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

The present disclosure includes several descriptions of exemplary "inks" used in an additive manufacturing process to form the inventive approaches described herein. It should be understood that "inks" (and singular forms thereof) may be used interchangeably and refer to a composition of matter comprising a composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

The following description discloses several preferred structures formed via direct ink writing (DIW), extrusion freeform fabrication, or other equivalent techniques and therefore exhibit unique structural and compositional characteristics conveyed via the precise control allowed by such techniques. DIW involves the forcing of an "ink" or paste-like material through a nozzle while moving a substrate beneath the nozzle whose motion creates a pattern to the strand. Parts are printed by layering the strands into a three-dimensional (3D) object, with or without porosity. The part retains a microstructure formed during printing due to a complex thixotropic rheology of the ink. The ink then cures either during or post printing to form a permanent shape.

The following description discloses several preferred embodiments of ink formulations for forming silicone based composite carbon dioxide sorbents and/or related systems and methods.

In one general embodiment, an ink includes a vinyl-terminated polydimethylsiloxane polymer, a polydimethylsiloxane copolymer having a hydride component, wherein a hydride to a vinyl ratio (hydride:vinyl) is in a range of greater than 1:1 to about 4:1, a hydrophobic filler, a crosslinking agent, and a carbon dioxide-binding component.

In another general embodiment, a method includes extruding an ink for forming a three-dimensional (3D) structure, the ink including a vinyl-terminated polydimethylsiloxane polymer, a polydimethylsiloxane copolymer having a hydride component, wherein a hydride to a vinyl ratio (hydride:vinyl) is in a range of greater than 1:1 to about 4:1, a hydrophobic filler, a crosslinking agent, and a carbon dioxide-binding component. The method further includes curing the 3D structure for forming a silicone polymer product having the carbon dioxide-binding component.

A list of acronyms used in the description is provided below.
3D Three-dimensional
AM Additive manufacturing
C Celsius
$CO_2$ carbon dioxide
DI Deionized
DIW Direct Ink Writing
g gram
kg kilogram
MeHSiO methylhydrosiloxane
$m^2/g$ meter squared/gram
mm millimeter
MOF metal organic framework
mol. % mole percent
Pa Pascals
PDMS polydimethylsiloxane
ppm parts per million
Pt Platinum
s seconds
wt. % weight percent Inks with a specific rheology used in direct ink write 3D printing allow the resulting 3D printed structures to retain their shape for an extended period of time before curing. According to various embodiments, siloxane-based inks with appropriate rheological behavior for 3D printing result in printing 3D structures with controlled architectures. Various embodiments described herein demonstrate the capability to tune the stiffness of printable siloxane materials by controlling the chemistry, network formation, and crosslink density of siloxane-based ink formulations in order to overcome the challenging interplay between ink development, post-processing, material properties, and performance. Some inks may have a less stiff rheology that extrude a less stiff structure that may be cured during the extrusion of the ink. These inks may include a catalyst, radical initiator, etc. and exposing the extruding ink to a UV light. Various embodiments described herein identify materials and methods by which to prepare custom-tailored 3D printable siloxane materials through DIW processes.

As described herein, a polymer formulation and manufacturing method produce composite carbon dioxide ($CO_2$) sorbents with tunable geometries and sub-millimeter filament diameters. In exemplary approaches, a preferred formulation of the ink allows extrusion of a self-supporting structure having an optimal content of $CO_2$-binding component for efficient $CO_2$ capture. In various approaches, the formulation enables extrusion-based manufacturing that produces material with specific and reproducible geometries in a manner amenable to scaling commercially. In one approach, once extrusion of 1 to 150 (or more) layers of the polymer ink is complete, the extrudate may be cured at 150° C. for 24 hours. Additionally, the formulation may be tuned to maximize carbonate retention and gas transport while controlling or minimizing water transport. These embodiments, as described herein, maximize the longevity and performance of the sorbent material for gas absorption. In some approaches, methodology may be included of using silicone inks as disclosed in U.S. patent application Ser. No. 16/384,520 which is hereby incorporated by reference.

In one embodiment, a formulation includes vinyl-terminated polydimethylsiloxane (PDMS), a PDMS copolymer having a hydride component (i.e., a hydride-containing PDMS copolymer), a hydrophobic filler, a crosslinking agent, and a $CO_2$-binding component. In preferred approaches, the vinyl-terminated PDMS may include a moles of vinyl per kilogram polymer ratio (mol vinyl/kg) in a range of about 0.01 mol vinyl/kg to about 0.10 mol vinyl/kg.

In some approaches, the siloxane polymer includes a vinyl-terminated siloxane macromer. In one approach, a siloxane polymer may be obtained commercially, e.g., Gelest DMS-V33 at 0.0550 mol vinyl/kg, Gelest DMS-V46 at 0.0190 mol vinyl/kg.

In other approaches, a short chain vinyl terminated PDMS additive may be included to impart greater hardness and less elongation to the cured material.

In preferred approaches, the siloxane polymer has a viscosity in a range of about 100 centistokes (cSt) to about 50,000 cSt. In one approach, the viscosity of the siloxane polymer may be about 3,500 cSt.

According to various embodiments, the silicone-based ink includes a hydride component to tune the hardness in the elastomeric material. In some approaches, the hydride component may include methylhydrosiloxane-dimethylsiloxane copolymers, e.g., trimethylsiloxy-terminated, hydride-terminated, etc. In some approaches, the hydride component may include at least one of the following hydride-terminated polydimethylsiloxane polymer, trimethylsiloxy-terminated polymethylhydrosiloxane polymer. In some approaches, the silicone-based ink may include a combination of hydride components. In one approach, a hydride composition may comprise about 10 mol. % to about 70 mol. % methylhydrosiloxane (MeHSiO). In a preferred approach, a hydride composition includes a range of about 20 mol. % to about 40 mol. % MeHSiO. In preferred approaches, a hydride-containing PDMS may be obtained commercially, e.g., Gelest HMS-301.

In various approaches, a molar ratio of hydride:vinyl may be in the range of 1:1 to about 4:1 in the ink. In preferred approaches, a molar ratio of hydride:vinyl may be in a range of about 1.5:1 to about 3:1. Increasing the hydride content of the ink increases the crosslinking efficiency since more hydrides are available to react with the vinyl groups, and thus the structural integrity (e.g., mechanical strength) of the resulting structure may be optimized. In preferred approaches, an upper limit of hydride:vinyl is about 4. Without wishing to be bound by any theory, it is believed that an excess of hydride in the formulation causes a change in the hydrophobicity of the overall ink formulation from reaction of the excess hydride groups with water, moisture, etc. In the presence of excess hydride, unreacted hydride groups (Si—H) may react with water resulting in the formation of hydroxide groups (Si—OH) increasing the hydrophilicity of the ink formulation.

The inventors surprisingly and unexpectedly found that a small adjustment of the molar ratio of hydride:vinyl of the PDMS components in the presence of the $CO_2$-binding component (e.g., sodium and/or potassium carbonate) of the ink allowed fine tuning of the viscosity of the ink for extrusion of self-supporting structures resulting in efficient reversible $CO_2$ binding to the material comprising the $CO_2$-binding component. Changes in the ratio of hydride:vinyl affected the stability of the ink. Without wishing to be bound by any theory, it is believed that small adjustments of the hydride:vinyl ratio of the PDMS components allow greater accessibility of the $CO_2$-binding component within the polymer structure and allows tuning and optimizing of $CO_2$ absorption and retention of the $CO_2$-binding component.

Moreover, for conventional silicone formulations, an additional silicone resin such as MQ resins are typically required for optimal viscosity and rheological properties of these formulations. However, in formulations described herein, an additional silicone resin is not necessary to achieve extrudability of the silicone-based ink having a $CO_2$-binding component. According to various embodiments, the formulation including the vinyl-terminated PDMS and hydride containing PDMS at the desired ratio of hydride:vinyl and a hydrophobic silica filler, but without any additional silicone resin such as MQ resin, having sufficient viscosity and rheology properties to extrude a self-supporting structure and are mechanically robust before and/or after curing.

In one embodiment, the silica filler may be a hydrophobic fumed silica. In a preferred approach, a specific surface area of a hydrophobic fumed silica may be within the range of 100-300 $m^2/g$. In various approaches, a hydrophobic fumed silica may be obtained commercially, e.g., Aerosil R8200 and R812S.

In preferred approaches, the hydrophobic filler (e.g., fumed silica) may contribute to optimal retention of $CO_2$-binding component in the final product and improve rheological properties to extrude a self-supporting structure. Contemplated approaches of ink formulations having a PDMS polymer of higher viscosity that in turn reduced the amount of hydrophobic silica in the formulation resulted in a polymer structure that had reduced retention of the $CO_2$-binding component that in turn resulted in lower $CO_2$ absorption capacity.

In one approach of the ink, the filler includes a fumed silica. In various approaches the filler is present in the ink at about 10 wt. % to about 40 wt. % relative to the weight of the ink not including the $CO_2$-binding component, and preferably in a range of about 20 wt. % to about 35 wt. % of the weight of the ink not including the $CO_2$-binding component.

In one embodiment, the silicone-based ink includes a crosslinking agent that includes a catalyst. In one approach, a catalyst of the ink may include a hydrosilylation catalyst. In some approaches, the crosslinking catalyst may utilize hydrosilylation chemistry during the curing of the 3D structure, such as a platinum crosslinking catalyst (e.g., Karstedt Pt catalyst), ruthenium crosslinking catalyst, iridium crosslinking catalyst, and/or rhodium crosslinking catalyst. In some approaches, platinum-catalyzed hydrosilylation chemistry (e.g., platinum catalyzed addition of hydro-silanes to vinyl-silanes) may be used to cure the structures formed with siloxane-based inks. In other approaches, ruthenium-catalyzed hydrosilylation chemistry may be used to cure the structures formed with siloxane-based inks. In yet other approaches, iridium-catalyzed hydrosilylation chemistry may be used to cure the structures formed with siloxane-based inks. In yet other approaches, rhodium-catalyzed hydrosilylation chemistry may be used to cure the structures formed with siloxane-based inks.

In one approach, exemplary hydrosilylation catalysts include a Karstedt's catalyst. In some approaches, the ink may also include a polymerizing inhibitor. In one approach, an inhibitor may be selected to pair with the catalyst activity. In one approach, an inhibitor may be included to complete the vinyl addition silicone cure (hydrosilylation) in a manner compatible with extrusion. For example, a Karstedt's catalyst may be paired with an inhibitor such as 1-ethynyl-1-cyclohexanol (ETCH) or 4-methoxyphenyl MEHQ.

In some approaches, it is advantageous to use platinum (Pt)-group metal-catalyzed hydrosilylation chemistry because the process does not generate volatile reaction products as compared to condensation cure reactions that produce byproducts such as acetic acid, ethanol, etc. Moreover, these byproducts could deleteriously contribute to some material shrinkage and deviation from the form of the printed 3D structure as deposited.

In some embodiments, the silicone-based ink may include a Pt-group metal crosslinking catalyst involved in metal catalyzed hydrosilylation chemistry, at a concentration in the range of about 1 to about 1000 ppm, and preferably in a range of about 1 to about 100 ppm, and ideally, 1 to about 50 ppm. In some approaches, the siloxane-based ink may include an effective amount of Pt-group metal to initiate a metal-catalyzed hydrosilylation chemistry curing reaction at pre-defined curing conditions, e.g., a pre-defined elevated temperature.

In an exemplary approach, the ink formulation includes the catalyst in a range of about 0.01 to about 0.10 wt. % of total ink formulation. In one approach, the ink formulation includes an inhibitor in a range of about 0.01 wt. % to about 0.10 wt. % of the total weight of the ink formulation.

In some approaches, the crosslinking agent may be a photoinitiator, radical initiator, etc. For example, the extruding ink may be cured using a UV light positioned near the nozzle. In some approaches, the siloxane based ink may include a photoinitiator such as 2-ethylhexyl 4-(dimethylamino)benzoate (EDHA), isopropylthioxanthone (ITX), etc. For example, the siloxane-based ink may include a mixture of 0.6 wt. % EDHA and 0.3 wt. % ITX. The weight percent of crosslinking agent may be based on the total weight of the siloxane components in the absence of carbonate.

In some embodiments, the silicone-based ink having a $CO_2$-binding component may include an effective amount of an inhibitor for controlling a rate of curing by the crosslinking catalyst under ambient atmospheric conditions, e.g., for increasing pot life duration. In one approach, small batches of silicone-based ink that are used as prepared may not include an inhibitor. In some approaches, the inhibitor may be selected based on the crosslinking catalyst. In some approaches, to maximize the printing time before cure (for example, delay the curing reaction as long as possible), an appropriate choice of a reaction inhibitor relative to the crosslinking catalyst may be added to inhibit platinum-catalyzed curing chemistry, thereby providing a prolonged pot life duration for extended 3D printing sessions.

In some embodiments, a rheology modifying additive may be added to impart silicone pseudoplasticity. Rheology modifying additives impart thixotropy in silicone materials. A rheology modifying additive may be a thixotropic additive that imparts pseudoplasticity in printable siloxane materials. In some approaches, the rheology modifying additive may be a silicone polyether, a methylvinyl siloxane (or dimethyl siloxane), dimethoxy (glycidoxypropyl)-terminated, glycerol, 2-propanol or combinations thereof. In one approach, a rheology modifying additive may be obtained commercially, e.g., Bluesil™ Thixo Add 22646 (Freeman Supply, Avon, Ohio) In some embodiments, the ink may include a rheology modifying additive in a range of about 0.01 wt. % to about 5.0 wt % of total composition of the ink without a $CO_2$-binding component, and preferably about 0.1 wt. % to about 0.5 wt. % of total composition of the ink without a $CO_2$-binding component.

In some embodiments, additives of various types may be present in an effective amount. In one approach, a cross-linking agent may be included to control leaching and swelling with water. It will likely also prove useful in tuning the hardness of the material to achieve a suitable strength for use as a packing material.

The ink formulation of a vinyl-terminated PDMS, hydride component, catalyst (and inhibitor) may be mixed with the $CO_2$-binding component. Exemplary examples of $CO_2$-binding component include, but are not limited to, carbonates (e.g., sodium carbonate, potassium carbonate, etc.), hydroxides, metal organic frameworks (MOFs), covalent organic frameworks (COFs), activated carbon, zeolite, amine-based sorbents, porous polymers, other sorbents, etc. In some approaches, the ink may include a combination of different types of $CO_2$-binding components, for example, sodium carbonate, potassium carbonate, a mixture of sodium carbonate and potassium carbonate, activated carbon, etc. In some approaches, the upper amount of $CO_2$-binding component may be limited by the effect of the $CO_2$-binding component on the structural framework of the polymer product. At higher amounts of $CO_2$-binding component in the ink formulation, the framework of the extruded structure may be less stable having a physical characteristic of being increasingly brittle. In exemplary approaches, the amount of $CO_2$-binding component is sufficient to provide efficient absorption of $CO_2$ without adversely affecting the mechanical integrity of the resulting polymer structure.

In some approaches, an amount of $CO_2$-binding component in the ink may be included in a range of greater than 0 wt. % up to 60 wt. % of total weight of ink. In a preferred approach, an amount of $CO_2$-binding component in the ink may be included in a range of greater than 10 wt. % up to 60 wt. % of total weight of the ink formulation.

In preferred approaches, the $CO_2$-binding component is in the form of a powder. A powder form of the $CO_2$-binding component allows optimal mixing of the ink formulation to retain hydrophobicity for extrusion and formation of a self-supporting structure.

In one approach, the $CO_2$-binding component is in particle form. The $CO_2$-binding component may be in the form of a plurality of particles. A size of the particles of $CO_2$-binding component may be defined by the size of the nozzle used for extrusion, e.g., a small diameter nozzle efficiently extrudes an ink formulation having particles of a diameter a fraction of the nozzle diameter. In one approach, a size of particles of $CO_2$-binding component may have an average diameter in a range of 10 microns ($\mu m$) up to greater than 100 microns. In some approaches, the average diameter of the particles may be up to 500 microns. In a preferred approach, an ink having optimal $CO_2$ absorption includes sodium carbonate particle having an average diameter sub-20 $\mu m$.

In some approaches, $CO_2$-binding component in particle form may be obtained commercially. In other approaches, forming the particles may include processes that grind and sieve commercially available sodium carbonate into smaller particles for a desired size.

In one embodiment, a silicone based ink having a $CO_2$-binding component may be formulated in a single mixture prior to extrusion for printing a structure. In one approach, components of the ink may be combined into a single mixture immediately prior to extrusion, e.g., within 15 minutes of extrusion of the ink. In another approach, components of the ink may be combined into a single mixture, preferably with an increased amount of inhibitor, to be used within 1 week (or longer in some cases) of extrusion of the ink. In some cases, extrusion of a single mixture that has been combined for more than a week may involve increased pressure for the desired extrusion during the printing.

In some embodiments, silicone-based inks having a $CO_2$-binding

TABLE 1

Silicone ink including a $CO_2$-binding component

| Part A | Part B |
|---|---|
| Vinyl-terminated PDMS | Vinyl-terminated PDMS |
| Catalyst | Hydride-containing PDMS |
| Hydrophobic Filler | Inhibitor (optional) |
| $CO_2$-binding Component | |
| Rheology Modifying Additive | | component may be formulated to yield two-part materials in predetermined ratios. As listed in Table 1, an ink formulation may include a two-part system, Part A/Part B. Part A may include a vinyl-terminated PDMS, a catalyst (e.g., a hydrosilylation catalyst), a hydrophobic silica, and a $CO_2$-binding component. Part B may include the vinyl-terminated PDMS, a hydride-containing PDMS copolymer, and an inhibitor. Formation of Part B may include dissolving the inhibitor in the vinyl-terminated PDMS following by mixing in the hydride-containing PDMS copolymer. In some approaches, Part B may also include the $CO_2$-binding components and/or the hydrophobic filler. In a preferred approach, following the mixing of Part A and Part B, a rheology additive may be added to the combined mixture.

In one approach, Part A and Part B may be stored separately at ambient temperatures, e.g., in a range of temperature between room temperature (20-25° C.) down to 0° C. for up to 3 months (or longer in some cases) prior to mixing. In some approaches, Part A may be assembled and then may be stored until use. Part B may be assembled and then stored until use. In other approaches, Part A and Part B may be assembled separately and used immediately. In exemplary approaches, prior to extrusion, Part A and Part B are preferably mixed to obtain the desired hydride:vinyl molar ratio. In one approach, the mixed formulation (part A+part B) can be stored at low temperature, e.g., near 0° C. for 60 days (or longer in some cases) until extrusion.

According to one embodiment, a 3D structure may be formed from the silicone-based ink having a $CO_2$-binding component that has physical characteristics of formation by additive manufacturing. In one approach, direct-ink-writing (DIW) affords the possibility of creating fine physical features (<1 mm) with single and multicomponent features not attainable by standard polymer casting methods. In one approach, a 3D structure may have a physical property of being rigid and the cured extruded continuous filament forms a unique-shaped structure. A unique-shaped structure may be any structure that does not have a conventional shape (e.g., cube, cylinder, molded shape, etc.). In some approaches, a shape of a unique-shaped structure may be defined by a user, a computer program, etc.

In one approach, a 3D structure is formed having physical characteristics of formation by extrusion, where the structure is self-supporting. Moreover, the structure is comprised of filaments having an average diameter in a range of greater than 100 µm to less than 10 mm, but in some cases the average diameter may be larger than 10 mm. These values of average diameter of an extruded filament are not meant to be limiting in any way, and the average diameter of the filaments reflect the diameter of the nozzle of the extrusion device. For example, a nozzle having a diameter of 1.6 mm may likely extrude a filament having an average diameter of about 1.6 mm. Nozzles having larger diameters extrude filaments having an average diameter essentially the same as the diameter of the nozzle. In some approaches, an extruded filament may be stretched to achieve a smaller filament diameter size, such that the resulting filament diameter size is smaller than the diameter of the nozzle.

According to various embodiments, the structure is configured to absorb $CO_2$. In some approaches, the average diameter of the extruded filament will be tuned to provide the optimal surface area for absorption of $CO_2$.

In some approaches, the architectural features of the formed 3D parts may have length scales defined by specific AM techniques. For example, features may have length scales in a range between 0.1 micron (µm) to greater than 100 µm, depending on the limitations of the AM techniques. In various approaches, AM techniques provide control of printing features, ligaments, etc. of 3D structures having length scales in a range between 0.1 µm to greater than 100 µm, and more likely greater than 10 µm. Further, a UV-curable functionality lends itself to light-driven AM techniques, including projection micro-stereolithography (PµSL) and direct laser writing via two photon polymerization (DLW-TPP). Stereolithography-based AM techniques are notable for high throughput, fine features, and detailed prototyping. Even higher resolution can be achieved with DLW-TPP, which can produce ligaments on the order of 100 nm.

The ink formulation may be extruded using a mechanical or pneumatic extruder fitted with die, nozzles, nozzle array, etc. In an exemplary approach, the extrusion process includes a pneumatic clay extruder fitted with a header plate of an array of nozzles having interchangeable tips. The process allows extrusion of a filament having a size in a range of approximately 100 µm to greater than about 10 mm.

In other approaches, additional die patterns may be included to allow extrusion of filament sizes greater than 1 mm.

In one extrusion process, an extruder functions in conjunction with automated stages to extrude a filament into a desired pattern. In principle, the automated states may move in at least one to all four directions, e.g., x, y, z, theta, to create a specific geometry of the extruded filament. In an exemplary approach, a combination of x-theta stages allow patterns to be extruded along the x-axis and radially, e.g., in a circular direction and/or curved fashion. For example, the extrusion substrate is fixed on the stages so that the composite material of ink formulation builds in the z-direction in a layer-by-layer manner. The material may be extruded in a circular geometry such that the extruded ink is stacked as packing material into a cylindrical column.

In one approach, the ink may be casted and/or extruded as a thin sheet having a thickness about equal to the thickness of the extruder. In one approach, the ink may be used with thin-film fabrication techniques. In one approach, an extrusion coating process using the ink forms a thin sheet having a micro-size thickness. In one approach, the ink may be used in a roll-to-roll process for forming a coating, printing, etc. a thin film. In various approaches, the ink may be extruded as a thin sheet having a thickness in a range of 25 µm to about 500 µm and may be thicker.

In some embodiments, silicone-based inks having a $CO_2$-binding agent may be pseudoplastic, non-Newtonian fluids, capable of being deposited in a layer-by-layer pattern, e.g., continuously for greater than 10 layers, during 3D printing.

FIG. 1 shows a method 100 for forming a 3D structure with the silicon-based ink having a $CO_2$-binding component, in accordance with one embodiment. As an option, the present method 100 may be implemented to construct structures such as those shown in the other FIGS. described herein. Of course, however, this method 100 and others presented herein may be used to form structures for a wide variety of devices and/or purposes which may or may not be related to the illustrative embodiments listed herein. Further, the methods presented herein may be carried out in any desired environment. Moreover, greater or fewer operations than those shown in FIG. 1 may be included in method 100, according to various embodiments. It should also be noted that any of the aforementioned features may be used in any of the embodiments described in accordance with the various methods.

According to one embodiment, the method 100 begins with step 102 involving extruding an ink for forming a three-dimensional (3D) structure. The ink may be of any type described herein according to the various approaches disclosed herein.

In some approaches, step 102 may include adding to the ink a crosslinking catalyst. In one approach, the crosslinking catalyst and/or crosslinking agent may be added to the ink in the cartridge of the extrusion device. Alternatively, the crosslinking catalyst may be part of a premade mixture that is fed through the cartridge.

In yet other approaches, step 102 may include adding to the ink an effective amount of an inhibitor for controlling a rate of curing by the crosslinking catalyst. In one approach, the inhibitor may be added to the ink in the cartridge of the extrusion device. Alternatively, the inhibitor may be part of a premade mixture that is fed through the cartridge.

In some approaches, step 102 includes extruding the ink through the cartridge to form a structure. In various approaches, the ink formulation imparts pseudoplasticity such that the compression stress of the ink in the cartridge allows the ink to be extruded from the cartridge during 3D printing.

In this and other embodiments, the ink may be extruded by a direct ink writing (DIW) device. In one approach, the ink may be extruded from a nozzle. In one approach, the ink may be added to a cartridge and the cartridge may include a nozzle. The ink may initially be in two parts (e.g., Part A and Part B) and may be combined (e.g., mixed) in the nozzle, where one or more of the components is added to the nozzle separately from the other components. A mixer may provide mixing within the nozzle. In another approach, the ink may be premade and fed to the nozzle.

For approaches involving extrusion-based additive manufacturing processes (e.g., DIW), the ink formulation preferably is extrudable from nozzle sizes ranging from about 100 µm to about 1 mm but could be smaller or larger.

In one approach, the forming of the 3D structure may include extruding a continuous filament of the silicone formulation (e.g., mixture, ink, etc.) through a nozzle to form a printed 3D structure having a plurality of continuous filaments arranged in a predefined pattern. In one approach, the predefined pattern may be a geometric pattern, e.g., a log-pile, a mesh, patterned architectures, cylinder, etc.

In one embodiment, the product is a 3D printed structure having continuous filaments arranged in a predefined pattern. The predefined pattern may be formed from extrusion-based AM methods wherein one or more continuous filaments are extruded with the silicone-based ink having a $CO_2$-binding component to form a predefined pattern.

In various approaches, for 3D printing of the ink composition using extrusion-based methodology, the ink composition preferably has shear-thinning behavior. In one approach, the ink composition may exhibit a transition from a gel to a liquid at high shear rates. In addition, in one approach, the gelled state of the extruded ink composition retains its shape to support its own weight during printing, i.e., the extruded structure is self-supporting.

In some approaches, the forming of a 3D structure includes forming a structure selected from one of the following: a mold, a cast, a template, etc. The ink may be extruded into a mold, cast, template, etc.

Step 104 of method 100 involves curing the 3D structure for forming a product. In various approaches, the 3D printed structure of silicone-based ink may be cured according to the crosslinking catalyst present in the silicone-based ink. In some approaches, the temperature may be raised in order to initiate curing. In various other approaches, curing may be initiated by methods known by one skilled in the art.

In one approach, the 3D structure may be cured to at least a pre-defined extent to form a silicone polymer matrix including a $CO_2$-binding component. In some approaches, the crosslinking catalyst may utilize hydrosilylation chemistry during the curing of the 3D structure. In one approach, the curing may occur at an elevated temperature. In one approach, a temperature of the curing may be in a range of about 30° C. to about 150° C. The conditions for curing as described herein are generally understood by one skilled in the art.

In some embodiments, the direct application of additive manufacturing using silicone-based inks having a $CO_2$-binding component with tunable stiffness may allow engineering of components and parts with specific properties including both low and high potential stiffness. In some approaches, silicone-based materials with differential stiffness may be 3D printed in tandem or simultaneously to generate unique objects with novel properties that are applicable to a wide-range of fields such as soft robotics and stretchable electronics.

According to various embodiment, ink formulations allow fabrication of structures for $CO_2$ absorption. $CO_2$ absorption in the formed structures may be measured in terms of $CO_2$ loading as measured by $CO_2$ uptake during a certain amount of time into the interstitial spaces of the structure formed from the formulation or by reaction with or adsorption onto the $CO_2$-binding component. This measurement may be obtained by the drop in gas pressure in the environment or as measured by infrared $CO_2$ sensors as an indication of uptake of $CO_2$ within the structure or a decrease in the $CO_2$ concentration in the gas surrounding the structure.

In typical procedures, each structure is run through a number of cycles where each cycle represents stripping the $CO_2$ from the structure and regenerating the structure for sorption of $CO_2$. In one approach, the stripping includes heating the structure that in turn dries the structure to regenerate the carbonate, the material of the structure is then re-hydrated to absorb $CO_2$. In another approach, the stripping includes air-stripping with humidified air to regenerate the carbonate.

The inventors surprisingly and unexpectedly found that in processes that heated the structure to regenerate carbonate, the "dry" samples are white because the carbonate as a solid form is white, then, when the samples are hydrated and the carbonate is in solution encapsulated within the polymer, the samples become translucent. The translucent silicone material of the structure clearly shows small pools of carbonate within the material.

EXPERIMENTS

DMS-V33 and DMS-V46 were obtained by Gelest, Inc (Morrisville, PA), Aerosil® R812S and Aerosil® 8200 were supplied by Evonik Industries (Essen, Germany). Dowsil™ SE1700 and Sylgard 184 was obtained by Ellsworth Adhesives and Krayden, Inc. MS, respectively.

Figure 6:
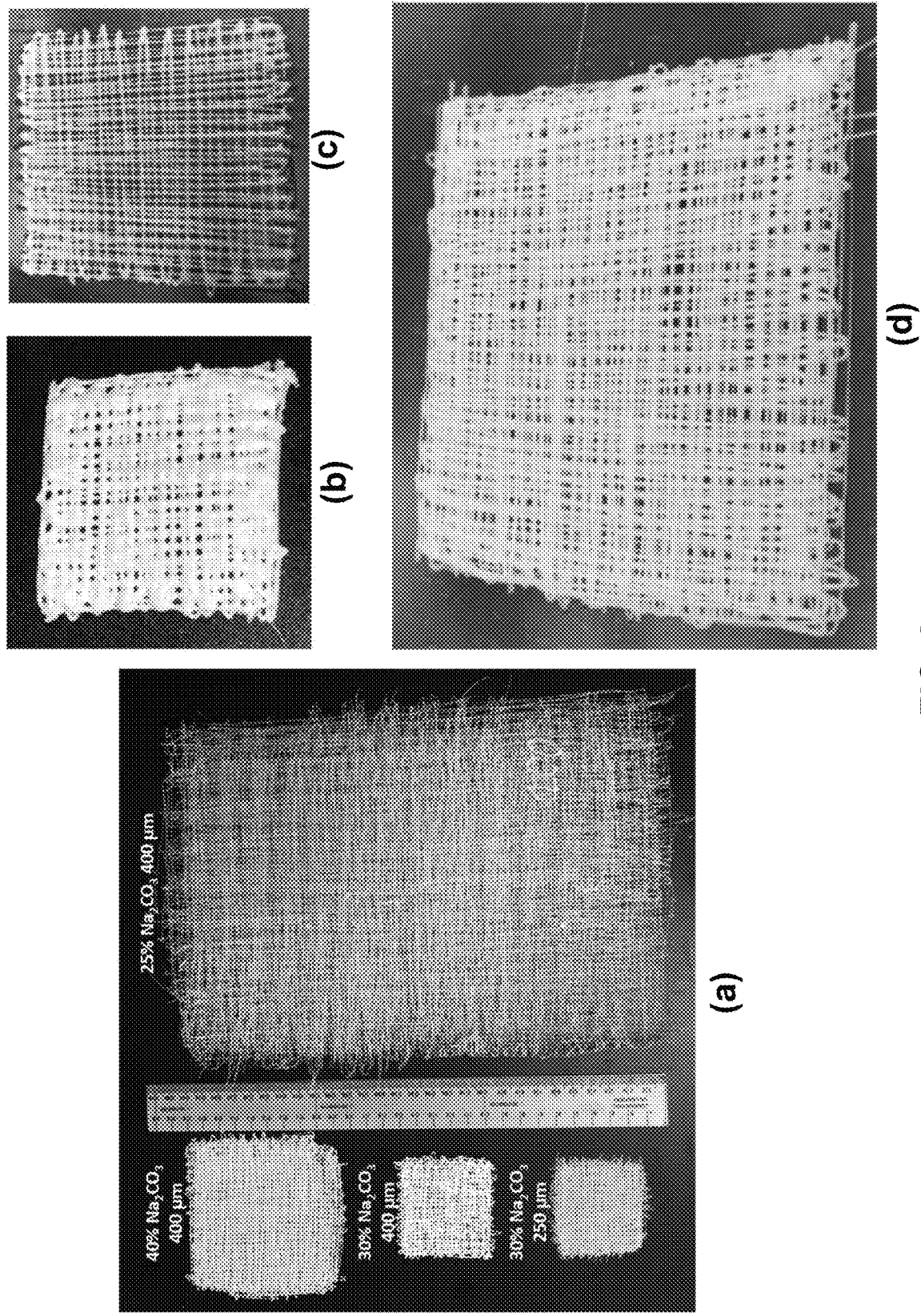
FIG. 6 depicts a series of images of sorbent composites formed using various ink formulations, according to one embodiment. Part (a) includes structures formed using a prior formulation of ink, parts (b), (c), and (d) include structures formed using an ink formulation having a different polymer and a different amount of hydrophobic filler.

Examples of Formulations of Silicone-Based Ink Having a $CO_2$-Binding Component FIG. 6 depicts images of structures formed using formulations of silicone-based ink. The image depicted in part (a) includes structures formed with an ink comprising a polymer Dowsil™ SE1700+silicone elastomer Sylgard 184 and varying concentrations of carbonate sorbent, from 25 wt. % $Na_2CO_3$ to 40 wt. % $Na_2CO_3$. Ink was extruded through a nozzle having a 400 μm diameter except the lower left structure of part (a) was formed by extrusion through a nozzle having a 250 μm diameter.

Parts (b), (c), and (d) depict composites formed with an ink having a different polymer and a different amount of hydrophobic filler, and the type of hydrophobic filler and weight percent of carbonate was the same as the composites of part (a). Part (b) of FIG. 6 is an image of a 3D structure formed with an ink formulation

TABLE 2

$CO_2$ absorbance efficiency with different forumations of silicone inks

| Sample | Formulation | Hydration (%) | Mass Loss (%) | $CO_2$ Loading (mmol/g) | # Cycles |
|---|---|---|---|---|---|
| 1 | V33 + 35% R8200 | 30 | −5.41 | 0.26 | 11 |
| 2 | V33 + 35% R8200 | 60 | −5.93 | 0.23 | 11 |
| 3 | V33 + 35% R8200 | 30 (DI water) | −8.67 | — | 5 |
| 4 | V33 + 35% R8200 | 30 (1.5 ratio) | −5.98 | — | 5 |
| 10 | V33 + 35% R8200 | 30 (3 ratio) | −7.13 | 0.249 | 10 |
| 11 | V33 + 35% R8200 (250 μm) | 30 (2.3 ratio) | −8.13 | 0.225 | 10 |
| 12 | V33 + 35% R8200 | 30 ($K_2CO_3$) | −8.39 | 0.213 | 10 |
| 13 | V33 + 35% R8200 | 60 ($K_2CO_3$) | −11.34 | 0.184 | 10 |
| 5 | V33 + 20% R812S | 30 | −5.94 | 0.49 | 5 |
| 6 | V33 + 20% R812S | 60 | −5.6 | 0.42 | 5 |
| 7 | V46 + 25% R8200 | 30 | −12.82 | 0.27 | 5 |
| 8 | SE 1700 + Sylgard | 30 | −3.58 | 0.21 | 4 |
| 9 | SE 1700 + Sylgard | 60 | −3.23 | 0.24 | 3 | comprising DMS-V46+25 wt. % R8200 hydrophobic fumed silica and 25 wt. % $Na_2CO_3$. Part (c) is an image of a 3D structure formed with an ink formulation comprising DMS-V46+15 wt. % R8200 hydrophobic fumed silica and 25 wt. % $Na_2CO_3$. Each ink was extruded through a nozzle having a 400 µm diameter.

Part (d) of FIG. 6 is an image of a 3D structure formed with an ink formulation comprising DMS-V33+35 wt. % R8200 hydrophobic fumed silica and 25 wt. % $Na_2CO_3$. The ink was extruded through a nozzle having a 400 µm diameter.

As shown in Table 2, structures formed using different ink formulations having a $CO_2$-binding component were assessed for $CO_2$ absorbance efficiency in terms of $CO_2$ loading. For each formulation, the hydride:vinyl ratio was 2.3, except for samples 4, 5, 6, 7 where the hydride:vinyl ratio was 1.5 and sample 10 where the hydride:vinyl ratio was 3. Each structure was formed using a nozzle having a 400 µm diameter except for sample 11 that was formed using a nozzle having a nozzle having a 250 µm diameter. Each formulation was measured for hydration as the percentage of mass each structure gained after soaking of the structure in a saturated aqueous solution of sodium carbonate, e.g., 17 wt. % sodium carbonate ($Na_2CO_3$), 17 to 25 wt. % potassium carbonate ($K_2CO_3$), or deionized (DI) water. For these assessments, each structure was hydrated to a level of approximately either 30 or 60% hydration, where % hydration means % mass gain compared to the initial dry mass of sample.

Mass loss was measured as a percentage of the mass lost after hydration, $CO_2$ loading and regeneration of the composite. The difference between the initial dry mass and the dry mass following the hydration, $CO_2$ loading and regeneration process indicated the amount of carbonate that is lost within the structure.

$CO_2$ loading was measured as the $CO_2$ uptake during a certain amount of time into the interstitial spaces of the structure formed from the formulation and reaction with the $CO_2$-binding component. This measurement may be obtained by the drop in gas pressure in the environment as an indication of uptake of $CO_2$ within the structure. Each structure was run through a number of cycles where each cycle represents drying the structure, hydrating the structure with an aqueous solution of sodium carbonate, and loading the structure with $CO_2$.

Figure 2A:
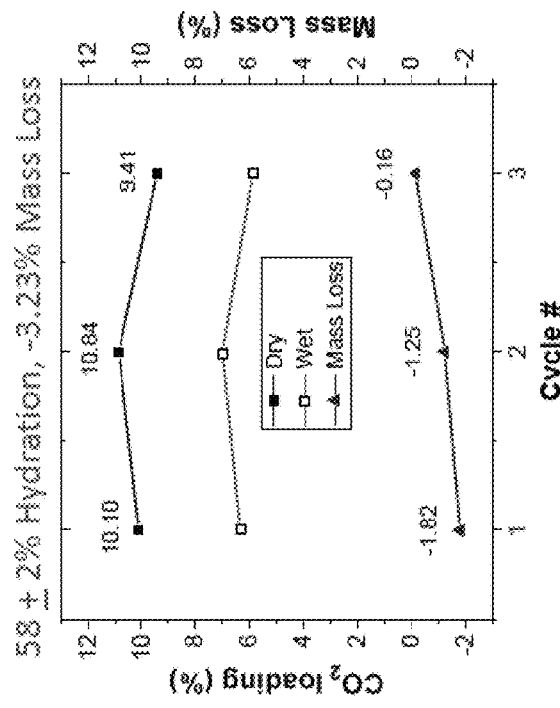
FIG. 2A is a plot of $CO_2$ loading and Mass loss of structures formed with a prior formulation of ink having 30% hydration.
Figure 2B:
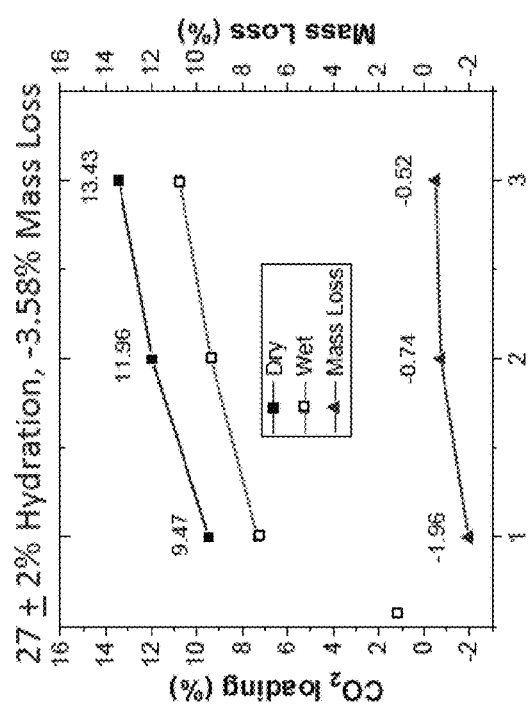
FIG. 2B is a plot of $CO_2$ loading and Mass loss of structures formed with a prior formulation of ink having 60% hydration.
Figure 2C:
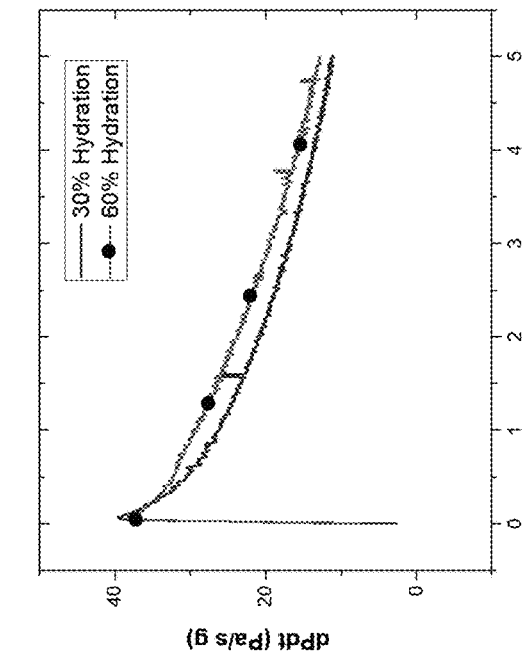
FIG. 2C is a plot of decreasing $CO_2$ gas pressure over time for structures formed with prior formulation of ink.

FIGS. 2A-2C are plots of carbonate retention and $CO_2$ absorption activity of structures formed with a prior formulation of ink that does not form a self-supporting structure. The ink formulation included 52 wt. % SE-1700 polymer plus 23 wt. % Sylgard and 25 wt. % sodium carbonate ($Na_2CO_3$) of total ink. The formulation was extruded through a 400 µm nozzle. $CO_2$ loading was performed starting at 40 kPa $CO_2$ gas for one hour. A structure was soaked in saturated carbonate solution to reach a hydration of 27±2% (FIG. 2A, and Sample 8, Table 2) and another structure was soaked in saturated carbonate solution to reach a hydration of 58±2% (FIG. 2B, and Sample 9, Table 2).

Parameters of $CO_2$ loading (%, left axis), were plotted for each saturated structure on a dry basis (■) and a wet basis (□) against Cycle # (bottom axis). Mass loss (%, right axis) against Cycle # (bottom axis) is also indicated (▲). FIGS. 2A and 2B illustrate that $CO_2$ loading was very similar (within the error of the measurement) during 3 cycles even though some of the carbonate was lost over each cycle. Moreover, for each subsequent cycle, a lower amount of carbonate was lost.

FIG. 2C is a plot comparing the $CO_2$ absorption rate as measured by rate of decrease in pressure of $CO_2$ of the structure formed with a prior formulation of ink having 30% hydration (black line) compared to the structure having 60% hydration (●). The structure having 60% hydration demonstrated a slightly quicker $CO_2$ absorption rate. As expected, the $CO_2$ absorption rate was higher for the sample with a higher hydration since the network includes increased amounts of dissolved carbonate.

Figure 3C:
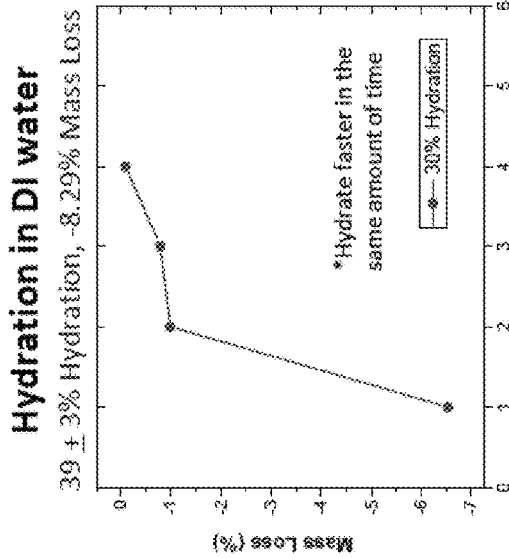
FIG. 3C is a plot of mass loss of a structure formed with an ink formulation including vinyl-terminated PDMS polymer and hydride-containing PDMS copolymer and hydrated in DI water, according to one embodiment.
Figure 3D:
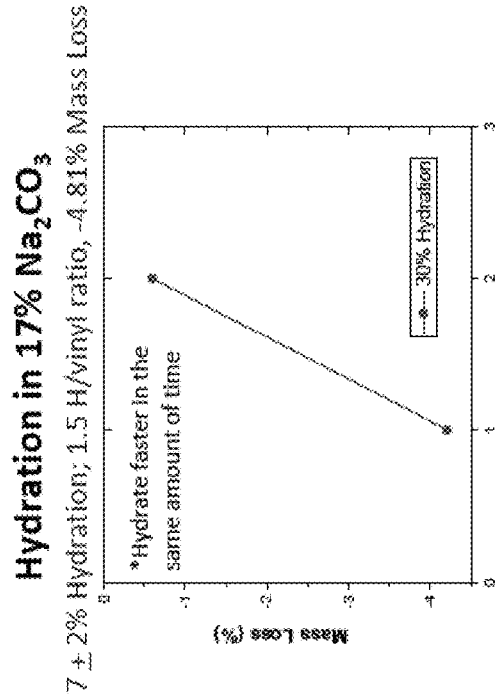
FIG. 3D is a plot of mass loss of a structure formed with an ink formulation including vinyl-terminated PDMS polymer and hydride-containing PDMS copolymer having a hydride:vinyl ratio of 1.5, and hydrated in saturated $Na_2CO_3$ solution, according to one embodiment.
Figure 3A:
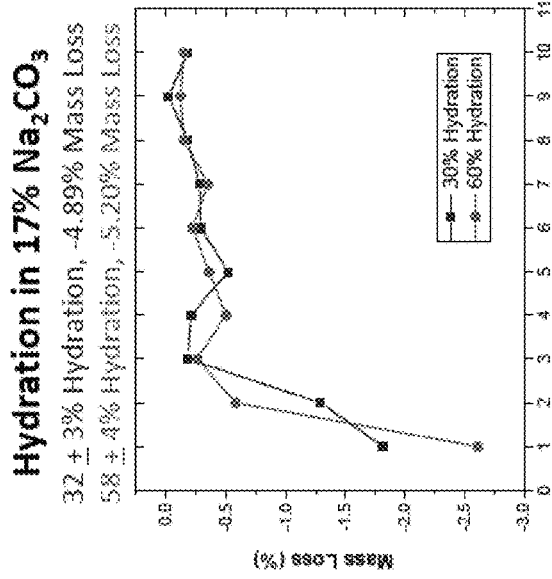
FIG. 3A is a plot of mass loss of structures formed with an ink formulation including vinyl-terminated PDMS polymer and hydride-containing PDMS copolymer, according to one embodiment.

FIGS. 3A-3D are plots of carbonate retention and $CO_2$ absorption activity of structures formed with a vinyl-terminated PDMS plus hydride containing PDMS formulation as described herein. The ink formulation included DMS-V33 polymer plus 35 wt. % R8200 hydrophobic fumed silica and 25 wt. % sodium carbonate ($Na_2CO_3$). The formulation was extruded through a 400 µm nozzle. $CO_2$ loading was performed starting with 40 kPa $CO_2$ gas for one hour. FIG. 3A is a plot of mass loss vs number of cycles of structures soaked in a 17 wt. % saturated $Na_2CO_3$ solution to reach a certain hydration: Hydration of about 30% (■, Sample 1, Table 2) and Hydration of about 60% (●, Sample 2, Table 2). The mass loss was comparable for each saturation with a steep decrease in % mass loss at the cycle 2.

Figure 3B:
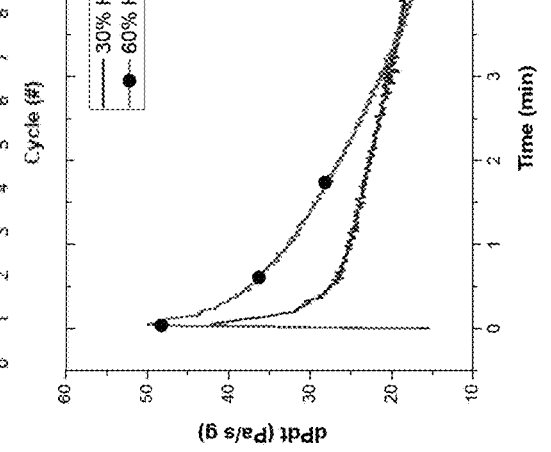
FIG. 3B is a plot of decreasing $CO_2$ gas pressure over time for structures formed with an ink formulation including vinyl-terminated PDMS polymer and hydride-containing PDMS copolymer, according to one embodiment.

FIG. 3B is a plot comparing the rate of decrease of pressure of $CO_2$ of the structure having 30% hydration (black line) compared to the structure having 60% hydration (●). The structures having 60% hydration demonstrated a larger rate of pressure decrease indicating a quicker $CO_2$ absorption rate.

FIG. 3C is a plot of mass loss versus number of cycles for a structure formed with the ink formulation of FIGS. 3A and 3B with hydration in deionized (DI) water to approximately 40% hydration (●, Sample 3 of Table 2). In the same amount of time, it was evident that the structure hydrated faster than the structures hydrated in saturated sodium carbonate solution (FIG. 3A). Moreover, hydration with DI water resulted in a higher carbonate loss from the structure compared to hydration of a structure in saturated carbonate solution. Other aqueous solutions may be used for hydration of a structure, e.g., DI water, saturated carbonate solution, etc.

FIG. 3D is a plot of mass loss for two cycles for a structure formed with an ink formulation having vinyl-terminated PDMS and hydride-hydride containing PDMS with a hydride:vinyl ratio of 1.5 (●, Sample 4, Table 2). The structure was soaked in saturated 17 wt. % $Na_2CO_3$ solution to a 30% hydration. In the same amount of time, it was evident that the structure hydrated faster than the structures with a higher hydride:vinyl ratio of 2.3 (FIG. 3A).

Figure 4B:
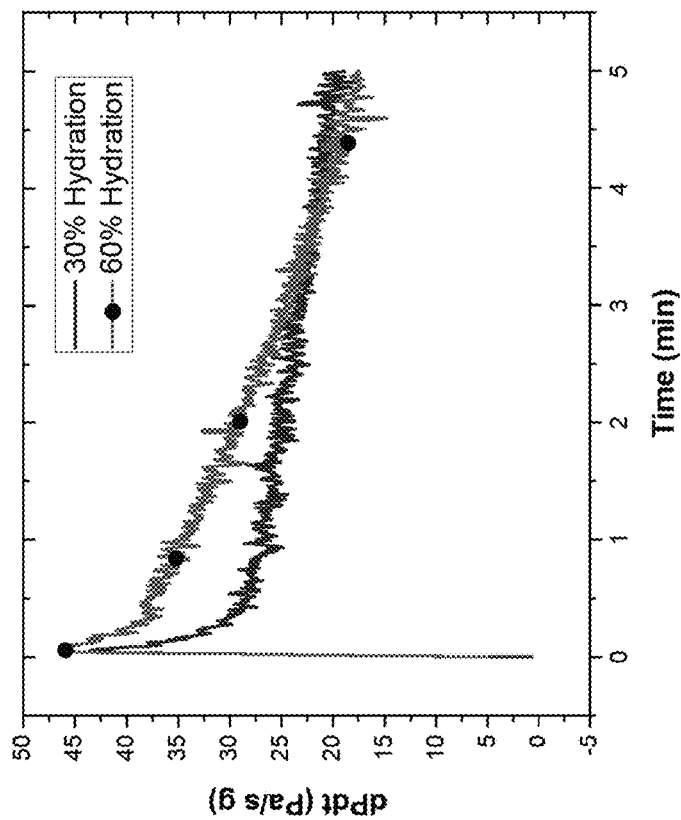
FIG. 4B is a plot of decreasing $CO_2$ gas pressure over time for structures formed with an ink formulation including vinyl-terminated PDMS polymer and hydride-containing PDMS copolymer, according to one embodiment.
Figure 4A:
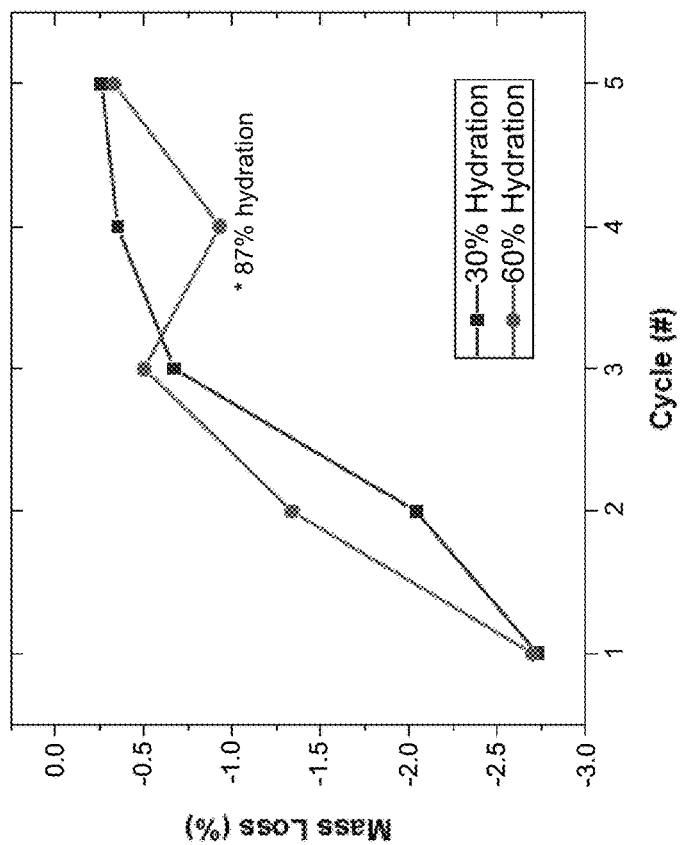
FIG. 4A is a plot of mass loss of structures formed with an ink formulation including vinyl-terminated PDMS polymer and hydride-containing PDMS copolymer and hydrated in saturated $Na_2CO_3$ solution to 30% and 60% hydration, according to one embodiment.

FIGS. 4A and 4B are plots of carbonate retention and $CO_2$ absorption activity of structures formed with a PDMS polymer DMS-V33 plus 20 wt. % R812S hydrophobic silica and 25 wt. % sodium carbonate ($Na_2CO_3$). The formulation was extruded through a 400 µm nozzle. $CO_2$ loading was performed starting with 40 kPa $CO_2$ gas for one hour. FIG. 4A is a plot of mass loss versus number of cycles of structures soaked in a 17 wt. % saturated $Na_2CO_3$ solution to reach a certain hydration: Hydration of about 30% (■, Sample 5, Table 2) and Hydration of about 60% (●, Sample 6, Table 2). The mass loss of the structure having 60% hydration was for the first 3 cycles compared to the mass loss of the structure having 30% hydration.

FIG. 4B is a plot comparing the rate of decrease of pressure of $CO_2$ of the structure having 30% hydration (black line) compared to the structure having 60% hydration (●). The structures having 60% hydration demonstrated a faster $CO_2$ absorption rate compared to the structure having 30% hydration.

Figure 5:
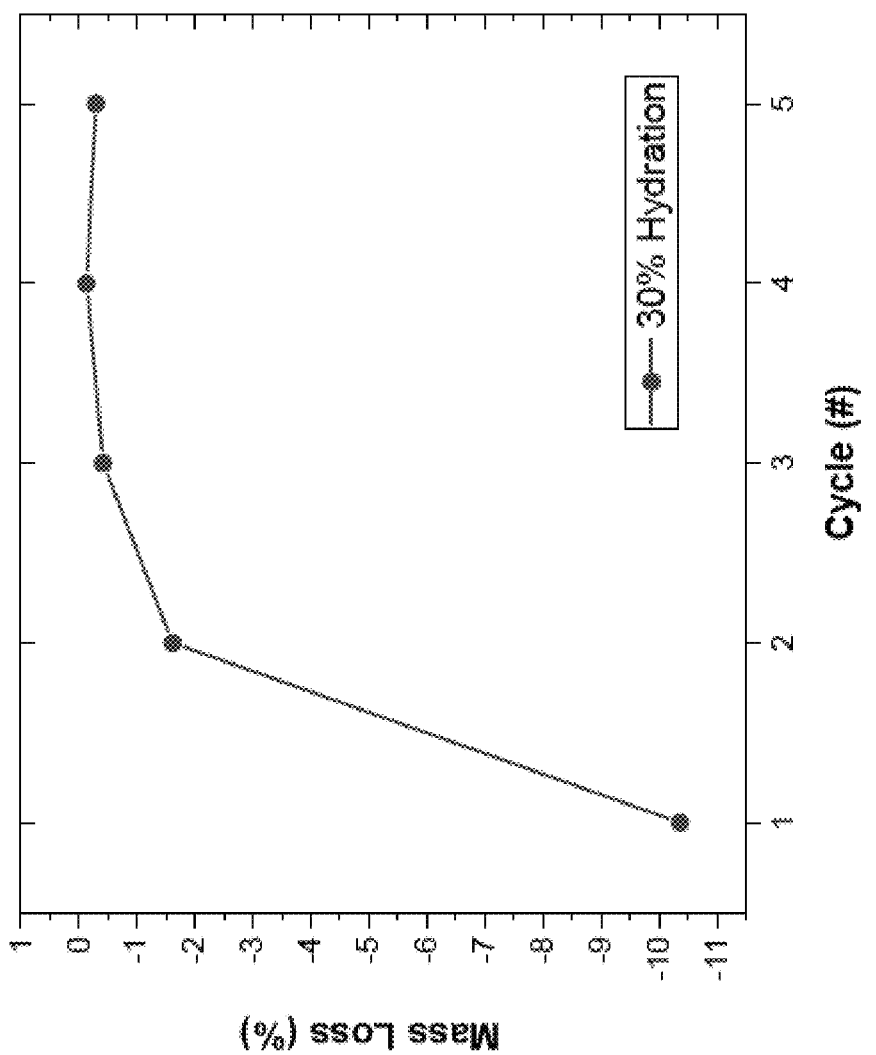
FIG. 5 is a plot of mass loss of a structure formed with an ink formulation including vinyl-terminated PDMS polymer and hydride-containing PDMS copolymer and hydrated in saturated $Na_2CO_3$ solution to 30% hydration, according to one embodiment.

FIG. 5 is a plot of mass loss of a structure formed with an ink formulation including vinyl-terminated PDMS polymer DMS-V46 plus 25 wt. % R8200 hydrophobic silica and 25 wt. % $Na_2CO_3$. The formulation was extruded through a 400 µm nozzle. $CO_2$ loading was performed starting with 40 kPa $CO_2$ gas for one hour. The structure formed of the formulation (Sample 7, Table 2) was soaked in saturated 17 wt. % $Na_2CO_3$ for a hydration of approximately 37±2%.

FIGS. 7A and 7B depict characteristics of structures formed with variations of ink formulations including vinyl-terminated DMS-V33 and 35 wt. % R8200 hydrophobic silica. The structures had varying ratios of hydride-containing PDMS copolymer and vinyl-terminated PDMS polymer (hydride:vinyl): ■ ratio of 2.3 hydride:vinyl, ● ratio of 2.3 hydride:vinyl, ▲ ratio of 3.0 hydride:vinyl, ▼ ratio of 1.5 hydride:vinyl, and ◆ 2.3 ratio of hydride:vinyl. Samples were treated under the same conditions after multiple loading and drying cycles. The hydration process of the structures included hydration at 30% using 17 wt. % $Na_2CO_3$, except the sample ● which was hydrated in DI water. Structures were formed by extrusion through a nozzle having a 400 µm diameter except the structure ◆ which was extruded through a nozzle having a 250 µm diameter.

Total mass loss percentage for sample depicted in the plot in FIG. 7A were calculated to be sample ■ −5.41%, sample ● −8.67%, sample ▲ −7.13%, sample ▼ −5.98%, and sample ■ −8.12%.

$CO_2$ gas pressure of structures as depicted in the plot in FIG. 7B showed decreasing gas pressure over time. An additional sample was included in the plot, ◄ having an ink formulation of SE1700+Sylgard.

Figure 8B:
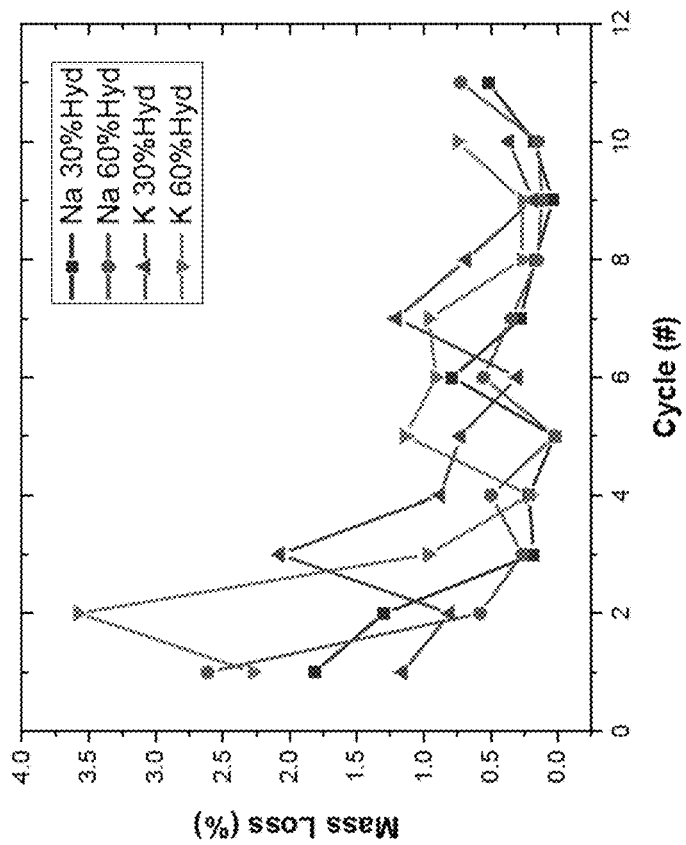
FIG. 8B is a graph of total mass loss percentage over 10 cycles of samples having a structure hydrated with sodium carbonate or potassium carbonate, according to one embodiment.
Figure 8A:
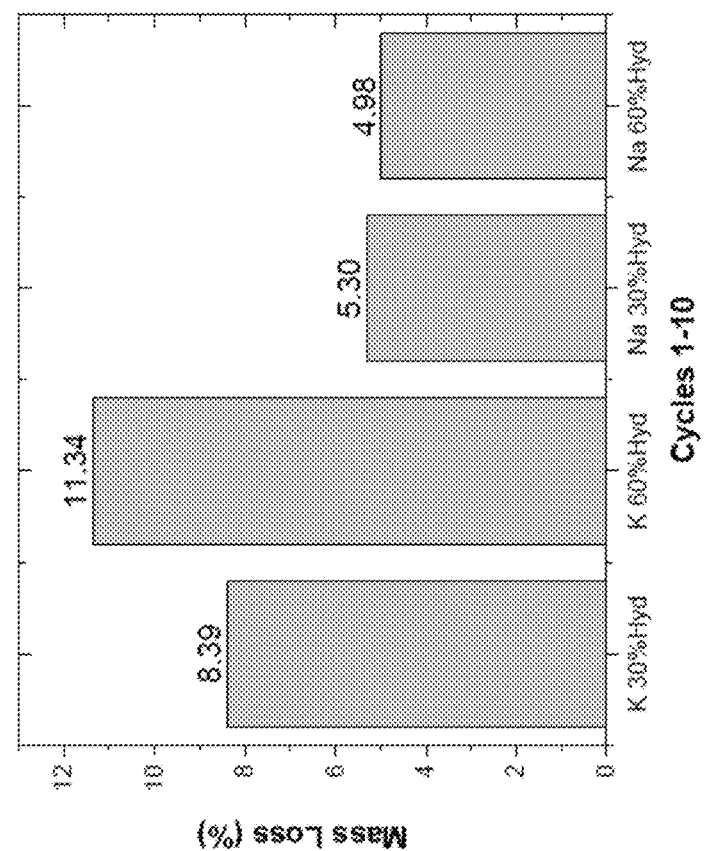
FIG. 8A is a plot of the mass loss percentage of samples from cycles 1 to 11 having structures hydrated with sodium carbonate or potassium carbonate, according to one embodiment.

FIG. 8A is a plot of mass loss over 11 cycles in structures that were formed with an ink including vinyl-terminated DMS-V33 (2.3 hydride:vinyl ratio), R8200 hydrophobic silica, and $Na_2CO_3$ or $K_2CO_3$, respectively, and hydrated with either 17 wt. % $Na_2CO_3$ or 25 wt. % $K_2CO_3$. The samples were loaded with $CO_2$ at 40 KPa for one hour. The samples were 30% hydration with $Na_2CO_3$ ■, 60% hydration with $Na_2CO_3$ ●, 30% hydration with $K_2CO_3$ ▲, and 60% hydration with $K_2CO_3$ ▼. All samples were treated under the same conditions after multiple loading and drying/regeneration cycles.

FIG. 8B is a graph showing the total mass loss percentage over 10 cycles of samples containing and hydrated with either $Na_2CO_3$ or $K_2CO_3$ as described for FIG. 8A.

Figure 9:
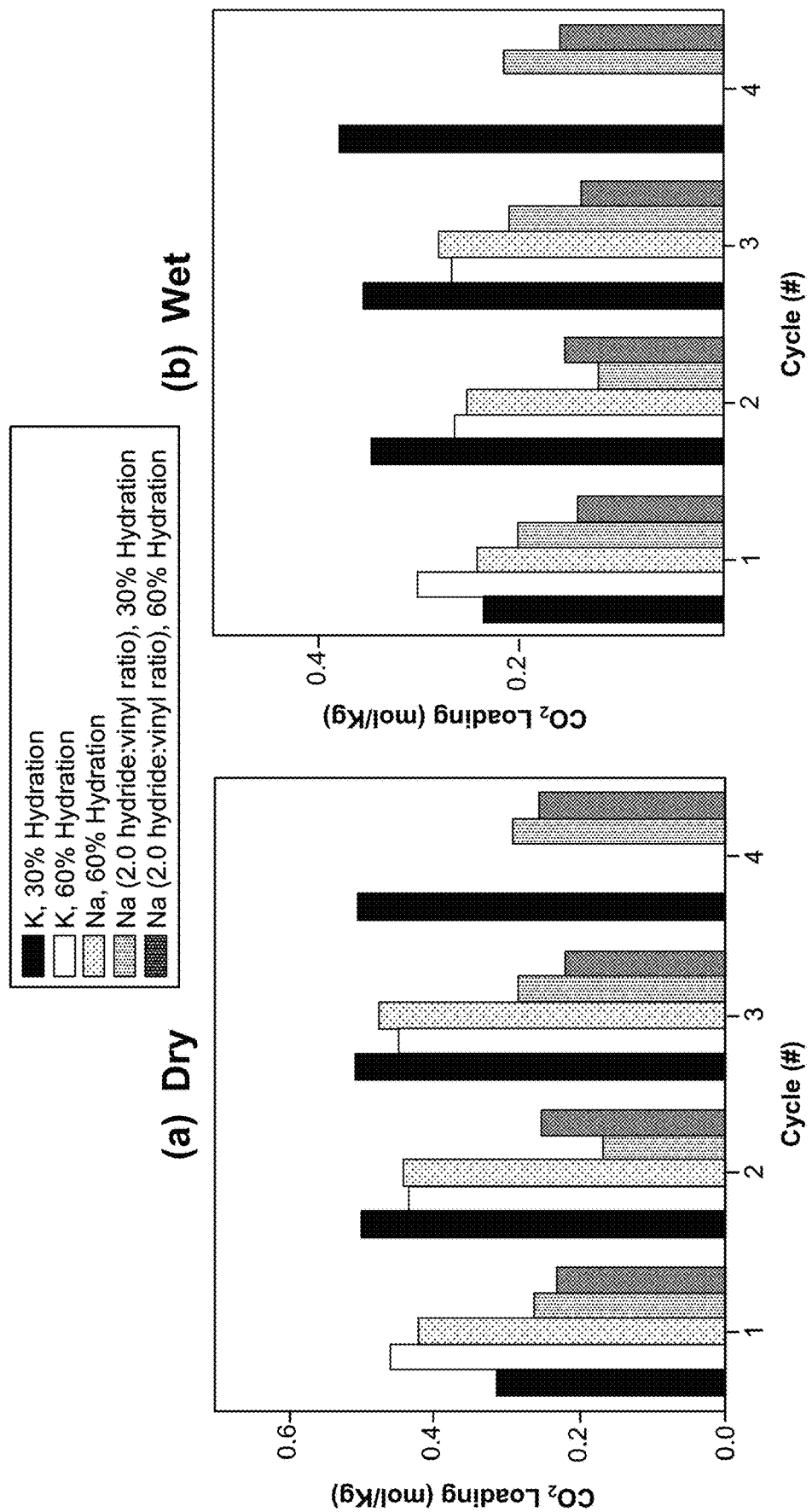
FIG. 9 is a comparison of $CO_2$ loading in samples having hydration with sodium carbonate or potassium carbonate, according to one embodiment. Part (a) shows $CO_2$ loading based on mass of dry samples; part (b) shows $CO_2$ loading based on mass of hydrated samples (wet).

FIG. 9 depicts the $CO_2$ loading of samples contained and hydrated with either $Na_2CO_3$ or $K_2CO_3$ (with an ink having a hydride:vinyl ratio of 2.3) as described for FIG. 8A. Two additional samples were formed and hydrated with $Na_2CO_3$ were formed with an ink having a hydride:vinyl ratio of 2.0 (Na (2.0 hydride:vinyl ratio)). The samples were at either 30% hydration or 60% hydration. Part (a) depicts the $CO_2$ loading calculated based on the mass of dry samples, and part (b) depicts the $CO_2$ loading calculated based on the mass of hydrated samples (wet).

Figure 10B:
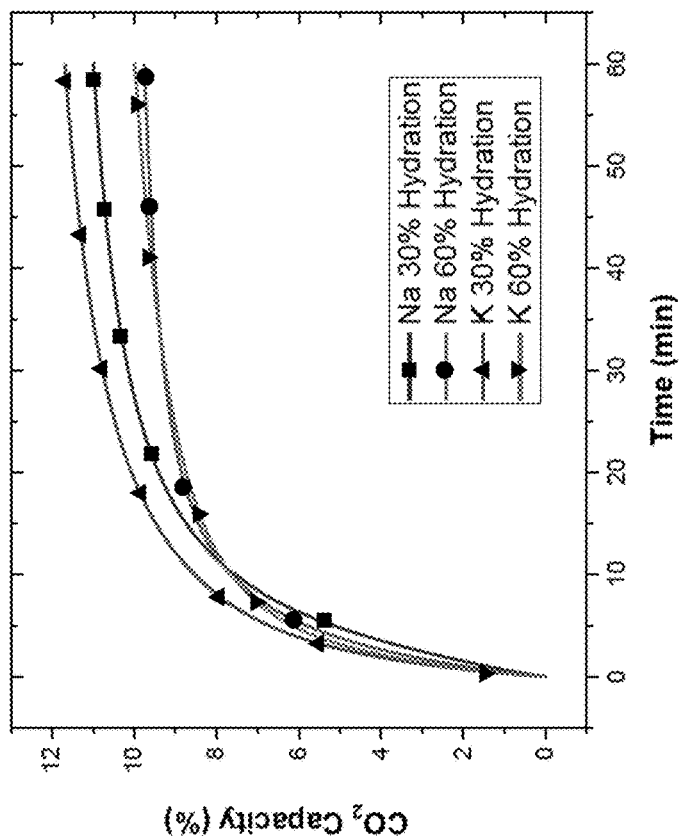
FIG. 10B is a plot of $CO_2$ capacity of samples hydrated with sodium carbonate or potassium carbonate, according to one embodiment.
Figure 10A:
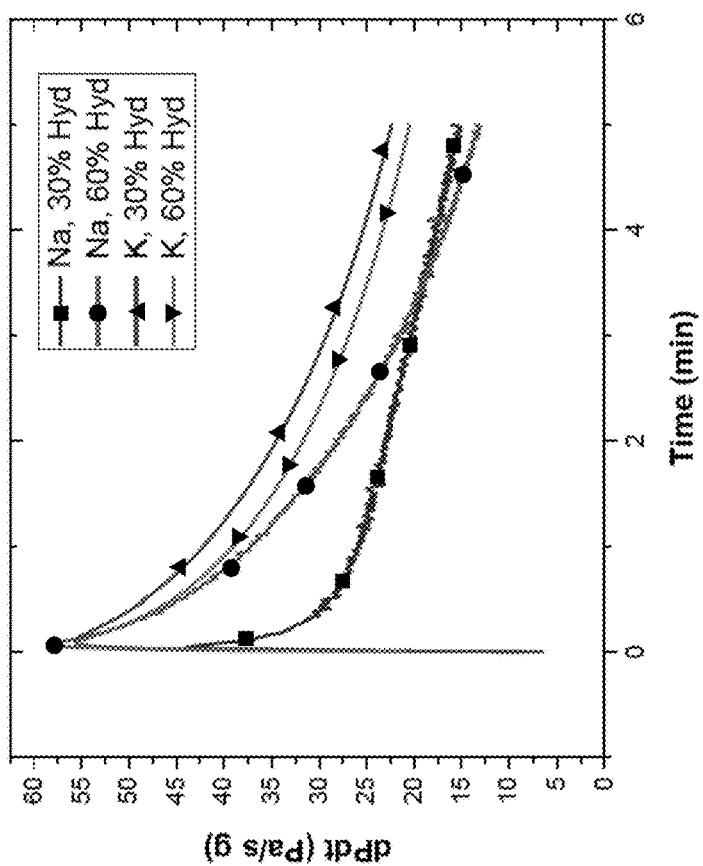
FIG. 10A is a plot of $CO_2$ gas pressure of samples hydrated with sodium carbonate or potassium carbonate, according to one embodiment.

FIGS. 10A and 10B depict characteristics of samples containing either $Na_2CO_3$ or $K_2CO_3$ as described for FIG. 8A. The samples were hydrated with either 17 wt. % $Na_2CO_3$ or 25 wt. % $K_2CO_3$. All samples were treated under the same conditions as for cycle 1. FIG. 10A shows decreasing $CO_2$ gas pressure over time with samples hydrated with either $Na_2CO_3$, ■, ●, or with $K_2CO_3$, ▲, ▼, showing faster decreasing of $CO_2$ pressure due to higher solubility of $K_2CO_3$ compared to $Na_2CO_3$.

FIG. 10B shows that samples hydrated with $K_2CO_3$, ▲, ▼, or with $Na_2CO_3$, ■, ●, have similar $CO_2$ capacity.

Figure 11:
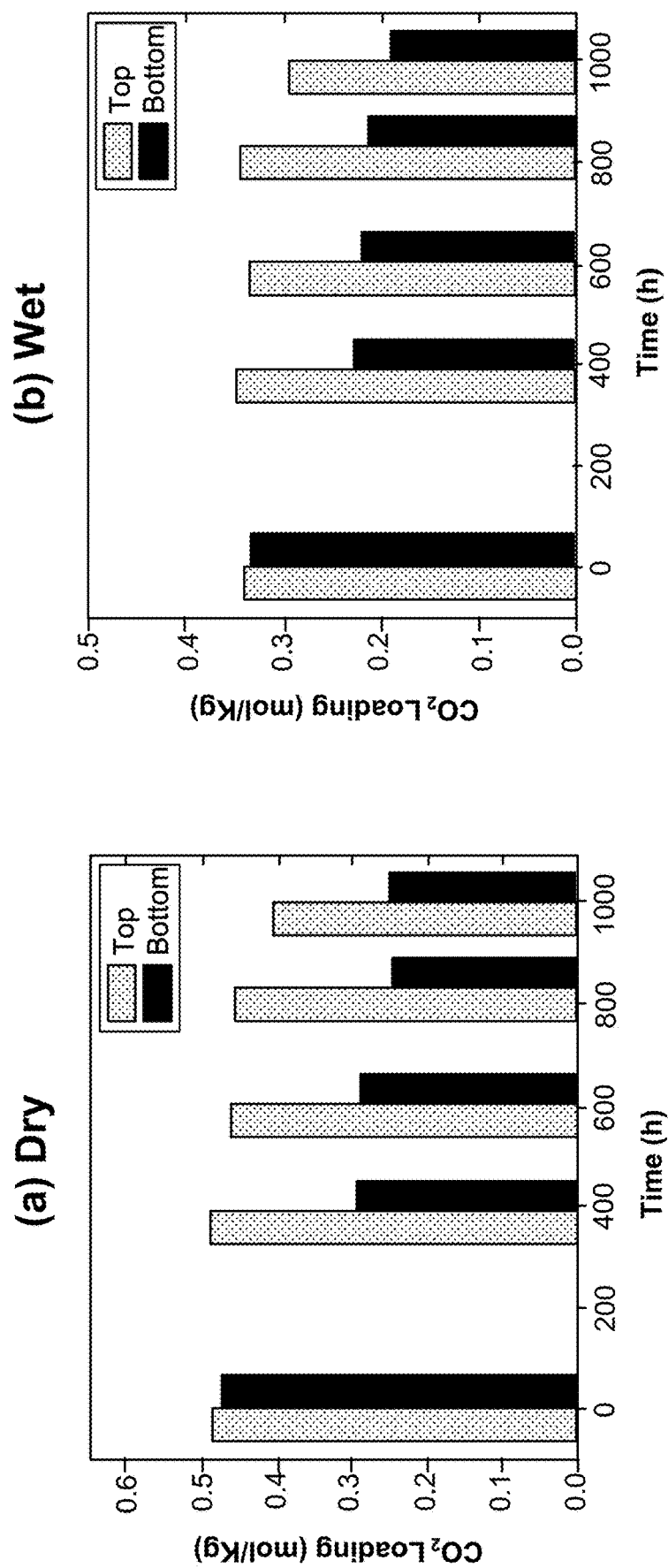
FIG. 11 is comparison of $CO_2$ loading in samples having a structure formed with an automatic extruder, according to one embodiment. Part (a) shows $CO_2$ loading based on mass of dry samples; part (b) shows $CO_2$ loading based on mass of hydrated samples (wet).

FIG. 11 depicts $CO_2$ loading of samples formed with an automatic extruder. The formulation of the ink for extrusion was vinyl-terminated DMS-V33 having a hydride:vinyl ratio of 2.3, R8200 hydrophobic silica, catalyst, and inhibitor, with 25 wt. % $Na_2CO_3$. Part (a) depicts the $CO_2$ loading calculated based on the mass of dry samples, and part (b) depicts the $CO_2$ loading calculated based on the mass of hydrated samples (wet).

As shown, the $CO_2$ loading based on dry mass of the sample (Dry, part (a)) was higher than $CO_2$ loading based on hydrated mass of the sample (Wet, part (b)). Samples in the form of discs were loaded in a column and were tested for absorption and regeneration cycles over 1000 hours. For the absorption cycle, a mixture of 40% $CO_2$ in $N_2$ was flowed from the top of the column, humidified air was flowed from the bottom of the column during a regeneration cycle. For each time point, every approximately 200 h, one sample was taken from the top of the column (Top) and one sample taken from the bottom (Bottom) of the column. The obtained samples (Top, Bottom) were dried in an oven at 150° C. during 16 h to fully regenerate, followed by hydration with 17 wt. % $Na_2CO_3$ to ~40% and tested in a pressure decay system until reaching equilibrium at ~40 KPa of $CO_2$ to calculate the $CO_2$ loading. Samples at Time 0 were pristine samples before exposure to the cycling testing process.

Over a duration of 1000 hours, the Top and Bottom samples retained the $CO_2$ loading capacity of ~82% and ~52% respectively based on dry mass of the samples and ~88% and ~58% retention of $CO_2$ loading capacity based on wet mass of the samples, and likely retain a $CO_2$ loading capacity for durations of longer than 1000 hours.

In Use

Various embodiments described herein may be applied to polymer manufacturing, composite manufacturing, solid sorbent manufacturing, etc.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments but should be defined only in accordance with the following claims and their equivalents.

What is claimed is:

1. An ink, comprising:
   a vinyl-terminated polydimethylsiloxane polymer;
   a polydimethylsiloxane copolymer having a hydride component, wherein a hydride to a vinyl ratio (hydride:vinyl) is in a range of greater than 1:1 to about 4:1;
   a hydrophobic filler;
   a crosslinking agent; and
   a carbon dioxide-binding component.

2. The ink as recited in claim 1, wherein the vinyl-terminated polydimethylsiloxane polymer has a vinyl content in a range of 0.01 to about 0.10 mole vinyl per kilogram polymer.

3. The ink as recited in claim 1, wherein the polymethylsiloxane copolymer having a hydride component is selected from the group consisting of: a methylhydrosiloxane-dimethylsiloxane copolymer, trimethylsiloxy and/or hydride-terminated, hydride-terminated polydimethylsiloxane polymer, trimethylsiloxy-terminated polymethylhydrosiloxane polymer, and a combination thereof.

4. The ink as recited in claim 1, wherein the ink includes a hydride composition having the polydimethylsiloxane copolymer, the hydride composition comprising about 10 mol. % to 70 mol. % methylhydrosiloxane.

5. The ink as recited in claim 1, wherein the filler includes fumed silica.

6. The ink as recited in claim 5, wherein the fumed silica has a surface area in a range of about 100 to about 300 $m^2/g$.

7. The ink as recited in claim 1, wherein the filler is present in the ink at about 5 wt. % to about 50 wt. % relative to the total weight of the ink.

8. The ink as recited in claim 1, further comprising an inhibitor.

9. The ink as recited in claim 1, further comprising a rheology modifying additive.

10. The ink as recited in claim 1, wherein the carbon dioxide-binding component is selected from the group consisting of: a carbonate, a metal organic framework, activated carbon, an amine-based sorbent, and a combination thereof.

11. The ink as recited in claim 10, wherein the carbon dioxide-binding component is in powder form.

12. The ink as recited in claim 10, wherein the carbon dioxide-binding component is in the form of a plurality of particles having an average diameter in a range of 10 microns to about 500 microns.

13. A product formed by extrusion of the ink as recited in claim 1, the product comprising
  a three-dimensional structure having physical characteristics of formation by extrusion,
  wherein the structure is self-supporting,
  wherein the structure is comprised of filaments having a diameter in a range of greater than 10 micron to about 10 millimeters,
  wherein the structure is configured to absorb $CO_2$.

14. A method of using the ink recited in claim 1, the method comprising:
  extruding the ink for forming a three-dimensional (3D) structure; and
  curing the 3D structure for forming a silicone polymer product having the carbon dioxide-binding component.

15. The method as recited in claim 14, wherein the vinyl-terminated polydimethylsiloxane polymer has a vinyl content in a range of 0.01 to about 0.10 mole vinyl per kilogram polymer.

16. The method as recited in claim 14, wherein the polymethylsiloxane copolymer having a hydride component is selected from the group consisting of: a methylhydrosiloxane-dimethylsiloxane copolymer, trimethylsiloxy and/or hydride-terminated, hydride-terminated polydimethylsiloxane polymer, trimethylsiloxy-terminated polymethylhydrosiloxane polymer, and a combination thereof.

17. The method as recited in claim 14, wherein the ink includes a hydride composition having the polydimethylsiloxane copolymer, the hydride composition comprising about 10 to 70 mol. % methylhydrosiloxane.

18. The method as recited in claim 14, wherein the filler includes a fumed silica.

19. The method as recited in claim 14, wherein the ink further comprises an inhibitor.

20. The method as recited in claim 14, wherein the ink is extruded by a direct ink writing device.

21. The method as recited in claim 14, wherein the ink is extruded as a continuous filament to form the structure comprising at least 10 layers prior to curing the structure.

22. The method as recited in claim 14, wherein the ink is extruded as a thin sheet having a thickness in a range of 25 microns to 500 microns.

* * * * *